US012688805B2

(12) United States Patent
Yamada

(10) Patent No.: US 12,688,805 B2
(45) Date of Patent: Jul. 21, 2026

(54) DISPLAY DEVICE

(71) Applicant: Sharp Display Technology Corporation, Kameyama City (JP)

(72) Inventor: Junichi Yamada, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 290 days.

(21) Appl. No.: 18/288,956

(22) PCT Filed: Jun. 9, 2021

(86) PCT No.: PCT/JP2021/021904
§ 371 (c)(1),
(2) Date: Oct. 30, 2023

(87) PCT Pub. No.: WO2022/259415
PCT Pub. Date: Dec. 15, 2022

(65) Prior Publication Data
US 2024/0212538 A1 Jun. 27, 2024

(51) Int. Cl.
*G09G 3/00* (2006.01)
*G09G 3/36* (2006.01)

(52) U.S. Cl.
CPC ........... *G09G 3/006* (2013.01); *G09G 3/3648* (2013.01); *G09G 2330/06* (2013.01); *G09G 2330/12* (2013.01)

(58) Field of Classification Search
CPC .. G09G 3/006; G09G 3/3648; G09G 2330/06; G09G 2330/12; G09F 9/00; G09F 9/30
See application file for complete search history.

(56) References Cited

U.S. PATENT DOCUMENTS 7,768,585 B2 * 8/2010 Nakamura ........... G09G 3/3688 349/40
2002/0191140 A1 * 12/2002 Eguchi .................. G02F 1/1345 349/149
2003/0057853 A1 * 3/2003 Ino ...................... G02F 1/13452 315/169.3
2007/0109485 A1 5/2007 Eguchi et al.
2010/0321624 A1 12/2010 Yanagisawa
2011/0234957 A1 * 9/2011 Watanabe ............. G02F 1/1345 349/139
2014/0117355 A1 5/2014 Yanagisawa
2014/0217412 A1 * 8/2014 Yanagisawa .......... G02F 1/1309 257/66

FOREIGN PATENT DOCUMENTS

JP 2002-072233 A 3/2002
JP 2003-066113 A 3/2003
JP 2011-002582 A 1/2011

* cited by examiner

*Primary Examiner* — Arleen M Vazquez
(74) *Attorney, Agent, or Firm* — ScienBiziP, P.C.

(57) ABSTRACT

A display device includes a semiconductor chip mounted in a frame region arranged around a display region, and a video protection circuit formed in the frame region, and the video protection circuit includes a low power supply connection portion formed between the semiconductor chip and the display region, and a high power supply connection portion formed under the semiconductor chip.

11 Claims, 16 Drawing Sheets

DISPLAY DEVICE

TECHNICAL FIELD

The disclosure relates to a display device including a semiconductor chip mounted in a frame region arranged around a display region of a display panel in order to supply a video signal to a plurality of pixels arranged in the display region.

BACKGROUND ART

There is known a display device including a semiconductor chip mounted in a frame region arranged around a liquid crystal display portion in order to supply a video signal to a plurality of liquid crystal display pixels arranged in the liquid crystal display portion of a liquid crystal panel (JP 2002-72233 A). A vertical drive circuit is arranged under this semiconductor chip.

SUMMARY

Technical Problem

The following problem occurs when a circuit such as a video protection circuit that needs to be arranged in each of a plurality of pixels arranged in a display region is arranged under a semiconductor chip (chip on plastic (COP)) mounted on a display panel.

A large number of COP terminals are formed on the back side of the COP. Since a panel terminal to be joined to the COP terminal is arranged at a position where the COP terminal exists, the circuit cannot be arranged. For this reason, when the region where the COP terminals do not exist on the back side of the COP is narrow, the region where the circuit is arranged becomes narrow, and there arises a problem that the arrangement of the circuit becomes difficult.

An object of one aspect of the disclosure is to provide a display device in which a circuit that needs to be arranged in each of a plurality of pixels arranged in a display region can be appropriately arranged in a display panel.

Solution to Problem

In order to solve the above problem, a display device according to one aspect of the disclosure includes: a semiconductor chip mounted in a frame region arranged around a display region in which a plurality of pixels of a display panel are formed; and a peripheral circuit formed in the frame region, in which the peripheral circuit includes an off-chip division circuit formed between the semiconductor chip and the display region, and an under-chip division circuit formed under the semiconductor chip.

Advantageous Effects of Disclosure

According to one aspect of the disclosure, in a display panel, a circuit that needs to be arranged in each of a plurality of pixels arranged in a display region can appropriately be arranged.

DESCRIPTION OF EMBODIMENTS

First Embodiment

Figure 1:
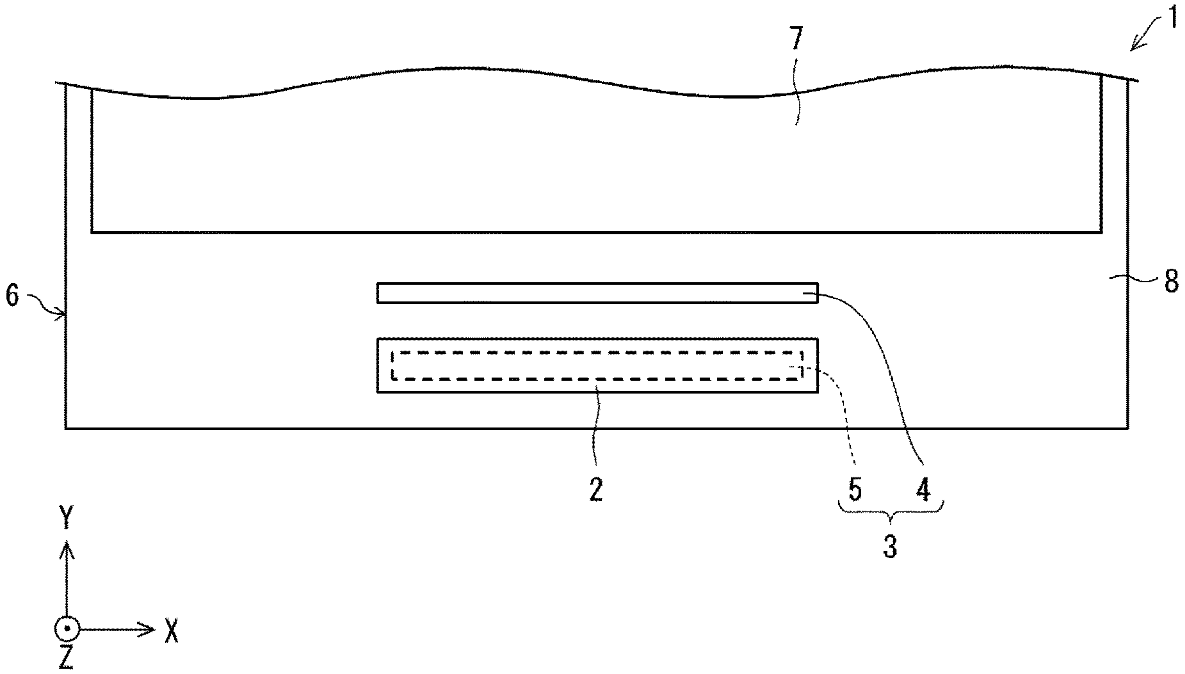
FIG. 1 is a plan view of a main part of a display device according to a first embodiment.
Figure 2:
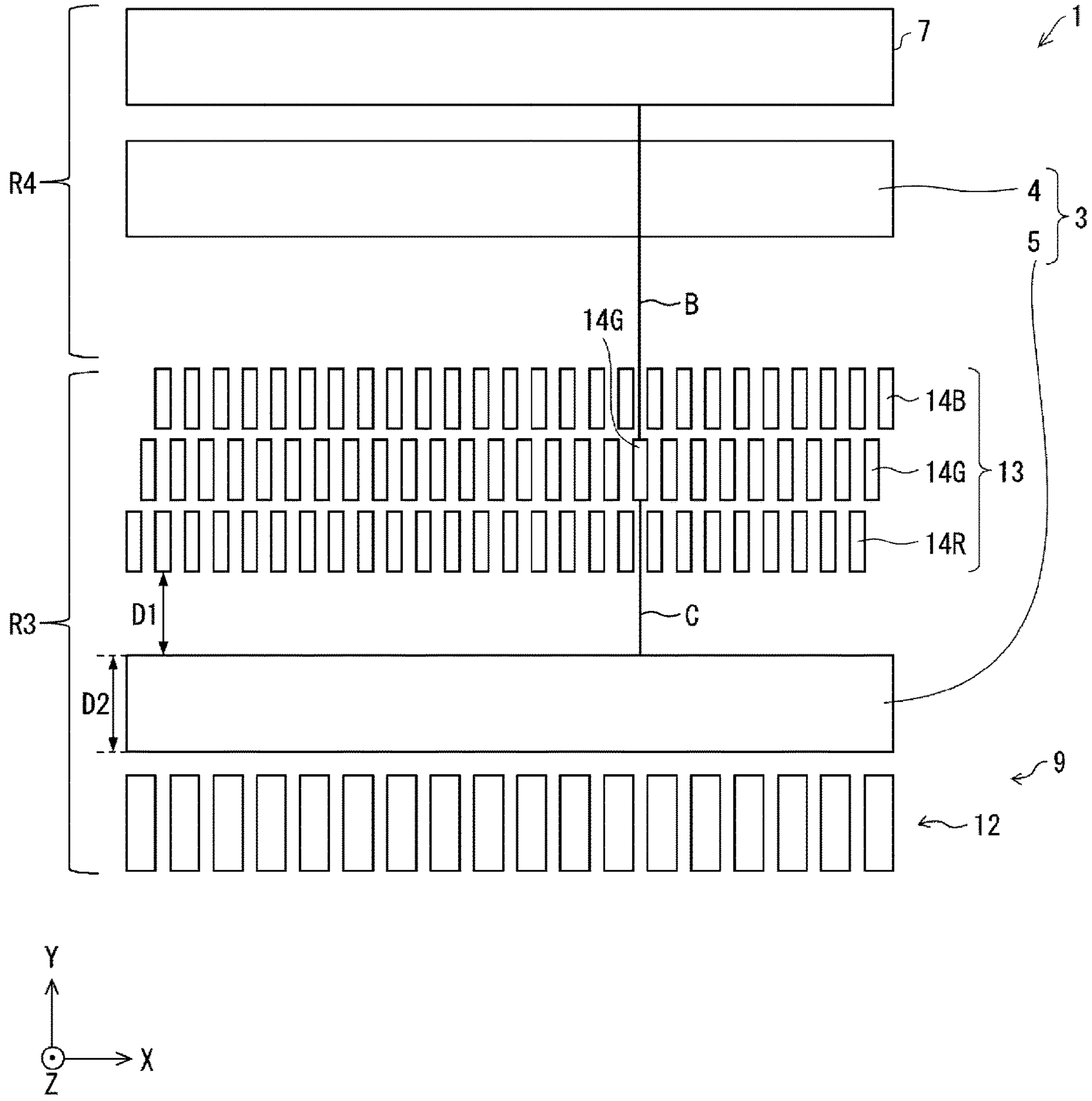
FIG. 2 is a schematic view illustrating an arrangement relationship among pixels, panel terminal portions, and a video protection circuit provided in the display device.
Figure 3:
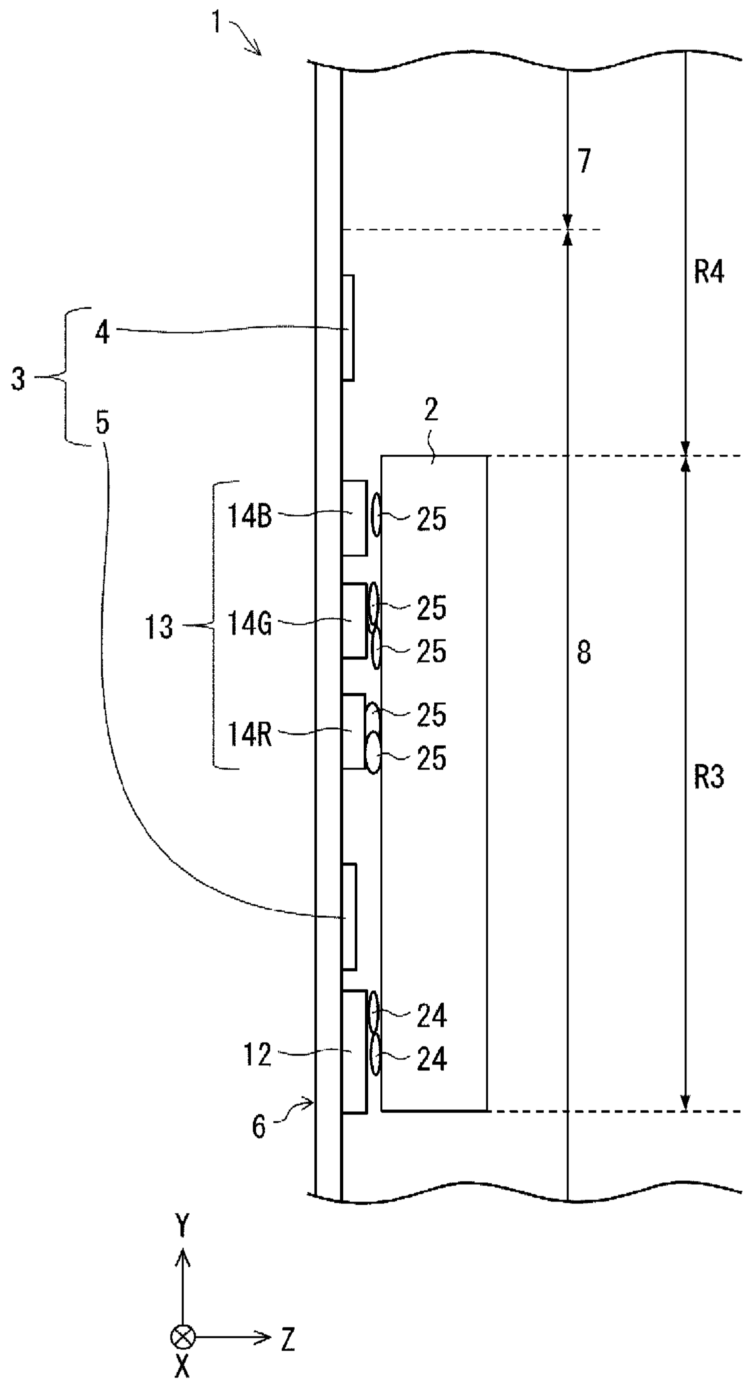
FIG. 3 is a cross-sectional view of the display device.

FIG. 1 is a plan view of a main part of a display device 1 according to the first embodiment. FIG. 2 is a schematic view illustrating the arrangement relationship among the pixels, a panel terminal portion 9, and a video protection circuit 3 provided in the display device 1. FIG. 3 is a cross-sectional view of the display device 1.

The display device 1 includes a semiconductor chip 2 mounted in a frame region 8 arranged around a display region 7 in order to supply a video signal to a plurality of pixels arranged in the display region 7 of a display panel 6, and the video protection circuit 3 (peripheral circuit) formed in the frame region 8 in order to protect the pixels of the display region 7 before the semiconductor chip 2 is mounted in the frame region 8.

The video protection circuit 3 includes a low power supply connection portion 4 (video protection circuit, first potential circuit, off-chip division circuit, and peripheral circuit) formed between the semiconductor chip 2 and the display region 7 and a high power supply connection portion 5 (video protection circuit, second potential circuit, under-chip division circuit, and peripheral circuit) formed under the semiconductor chip 2. The low power supply connection portion 4 is connected to a low power supply (first potential power supply) having a first potential. The high power supply connection portion 5 is connected to a high power supply (second potential power supply) having a second potential higher than the first potential.

The semiconductor chip 2 includes, on a lower surface facing the display panel 6, a plurality of input terminals 24 formed on the opposite side of the display region 7 and a plurality of output terminals 25 formed on the display region 7 side. The plurality of input terminals 24 are arrayed along an X direction corresponding to a longitudinal direction of the semiconductor chip 2. The plurality of output terminals 25 are arrayed along the X direction corresponding to the longitudinal direction of the semiconductor chip 2. The display panel 6 includes the panel terminal portion 9 to which the plurality of input terminals 24 and the plurality of output terminals 25 of the semiconductor chip 2 are each joined.

The panel terminal portion 9 includes an input terminal portion 12 for supplying an input signal to the input terminals 24 of the semiconductor chip 2 and an output terminal portion 13 for receiving a video signal output from the output terminals 25 of the semiconductor chip 2. The high power supply connection portion 5 is arranged between the input terminal portion 12 and the output terminal portion 13.

The output terminal portion 13 includes a plurality of panel terminals 14R arrayed along the X direction for receiving, from the semiconductor chip 2, a video signal corresponding to a pixel that emits red light, a plurality of panel terminals 14G arrayed along the X direction for receiving a video signal corresponding to a pixel that emits green light, and a plurality of panel terminals 14B arrayed along the X direction for receiving a video signal corresponding to a pixel that emits blue light. The plurality of panel terminals 14R, the plurality of panel terminals 14G, and the plurality of panel terminals 14B are arrayed in a staggered array in which the panel terminals are arrayed obliquely to one another.

The video protection circuit 3 is provided to protect, from static electricity entering through the panel terminals 14R, the panel terminals 14G, or the panel terminals 14B, the pixel circuit of the display region 7, the pixel circuits for controlling the pixels.

Figure 4:
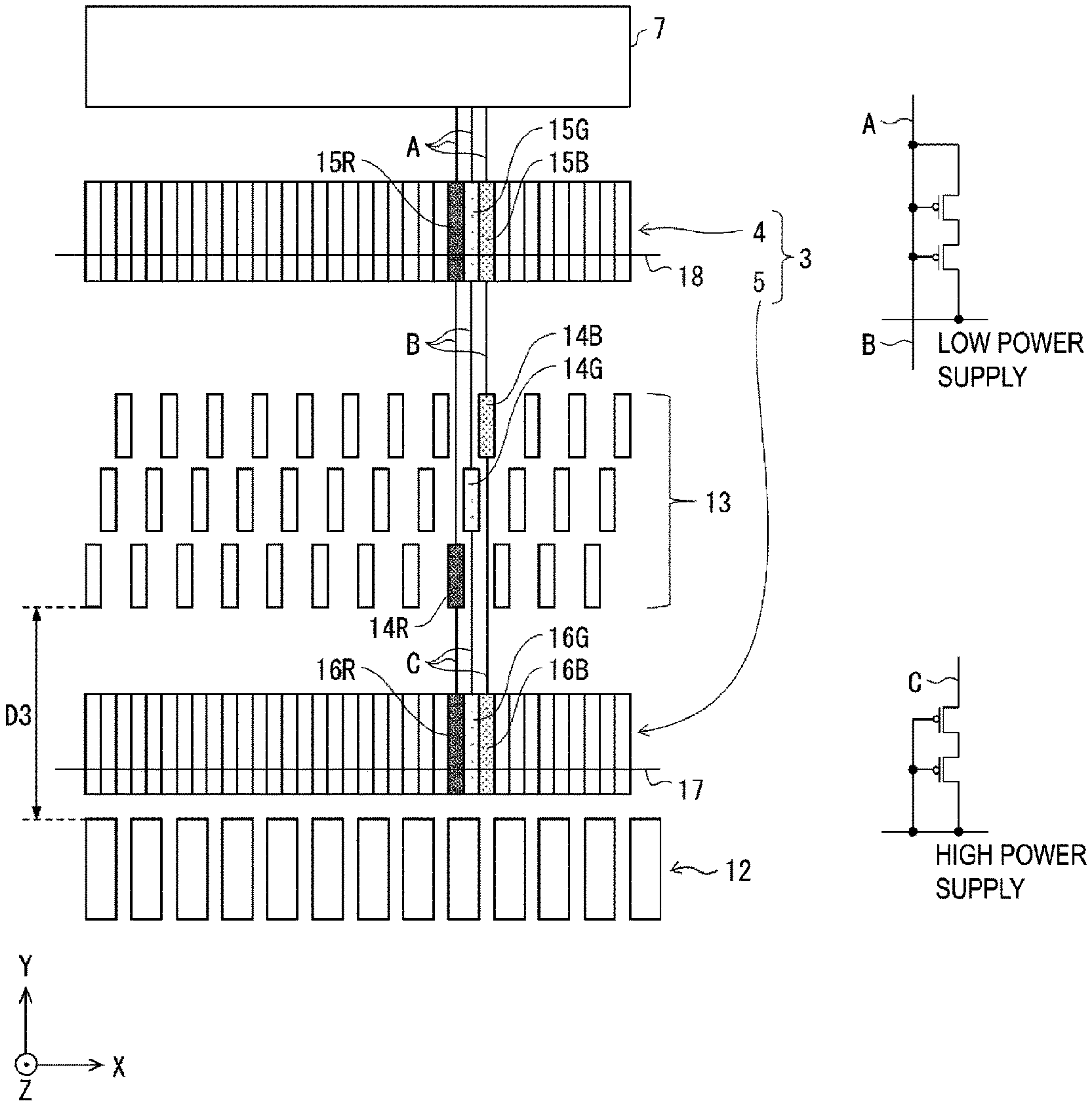
FIG. 4 is a schematic view illustrating an arrangement relationship between a high power supply connection portion and a low power supply connection portion provided in the video protection circuit.

FIG. 4 is a schematic view illustrating the arrangement relationship of the high power supply connection portion 5 and the low power supply connection portion 4 provided in the video protection circuit 3.

In the low power supply connection portion 4, low power supply connection circuits 15R, 15G, and 15B (video protection circuit, first potential circuit, off-chip division circuit, and peripheral circuit) are repeatedly arrayed in this order along the X direction. These low power supply connection circuits 15R, 15G, and 15B are connected to a low power supply line 18 that is common and coupled to the low power supply.

The low power supply connection circuit 15R is connected to a pixel that emits red light of the display region 7 and a pixel circuit for controlling the pixel. The low power supply connection circuit 15G is connected to a pixel that emits green light and a pixel circuit for controlling the pixel. The low power supply connection circuit 15B is connected to a pixel that emits blue light and a pixel circuit for controlling the pixel.

In the high power supply connection portion 5, high power supply connection circuits 16R, 16G, and 16B (video protection circuit, second potential circuit, under-chip division circuit, and peripheral circuit) are repeatedly arrayed in this order along the X direction. These high power supply connection circuits 16R, 16G, and 16B are connected to a high power supply line 17 that is common and coupled to the high power supply.

The panel terminal 14R is connected to the low power supply connection circuit 15R arranged outside the semiconductor chip 2 via a wiring line B, and is connected to the high power supply connection circuit 16R arranged under the semiconductor chip 2 via a wiring line C. Then, the low power supply connection circuit 15R is connected to the pixel for emitting red light of the display region 7 via a wiring line A.

Similarly, the panel terminal 14G is connected to the low power supply connection circuit 15G via the wiring line B, and is connected to the high power supply connection circuit 16G via the wiring line C. Then, the low power supply connection circuit 15G is connected to the pixel for emitting green light of the display region 7 via the wiring line A. Similarly, the panel terminal 14B is connected to the low power supply connection circuit 15B via the wiring line B, and is connected to the high power supply connection circuit 16B via the wiring line C. Then, the low power supply connection circuit 15B is connected to the pixel for emitting blue light of the display region 7 via the wiring line A.

The input terminal portion 12, the output terminal portion 13, and the high power supply connection portion 5 are arranged in a region R3 under the semiconductor chip 2. The low power supply connection portion 4 and the display region 7 are arranged in a region R4 outside the semiconductor chip 2.

Figure 5:
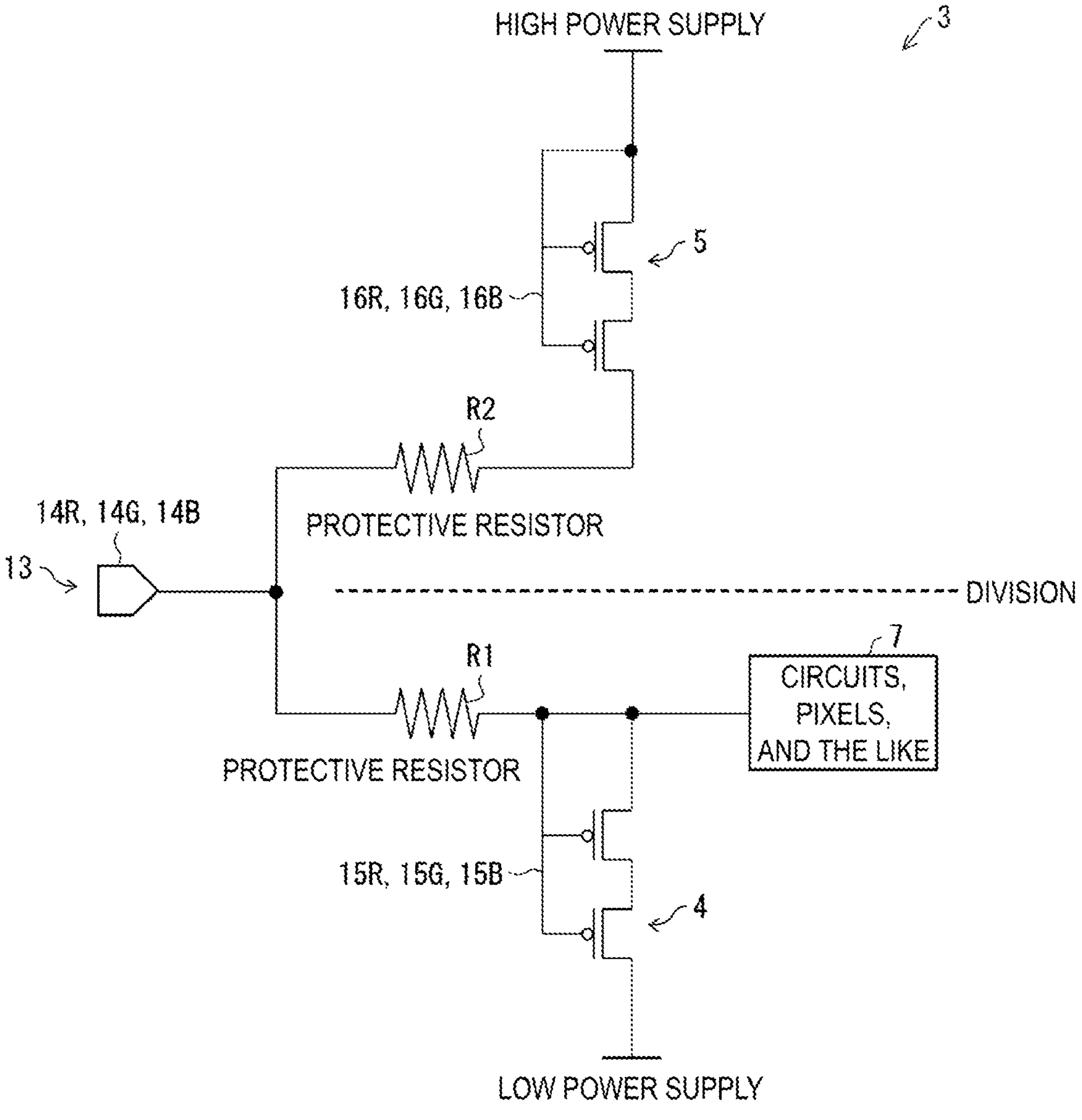
FIG. 5 is a circuit diagram of the high power supply connection portion and the low power supply connection portion provided in the video protection circuit.

FIG. 5 is a circuit diagram of the high power supply connection portion 5 and the low power supply connection portion 4 provided in the video protection circuit 3.

The video protection circuit 3 is divided into the high power supply connection portion 5 and the low power supply connection portion 4. The high power supply connection portion 5 is arranged between the input terminal portion 12 and the output terminal portion 13 under the semiconductor chip 2. The low power supply connection portion 4 is arranged between the output terminal portion 13 and the display region 7.

The low power supply connection portion 4 includes a protective resistor R1 whose electric resistance value is defined by the length of the wiring line B, and the low power supply connection circuits 15R, 15G, and 15B. The high power supply connection portion 5 includes a protective resistor R2 whose electric resistance value is defined by the length of the wiring line C, and the high power supply connection circuits 16R, 16G, and 16B.

Figure 6:
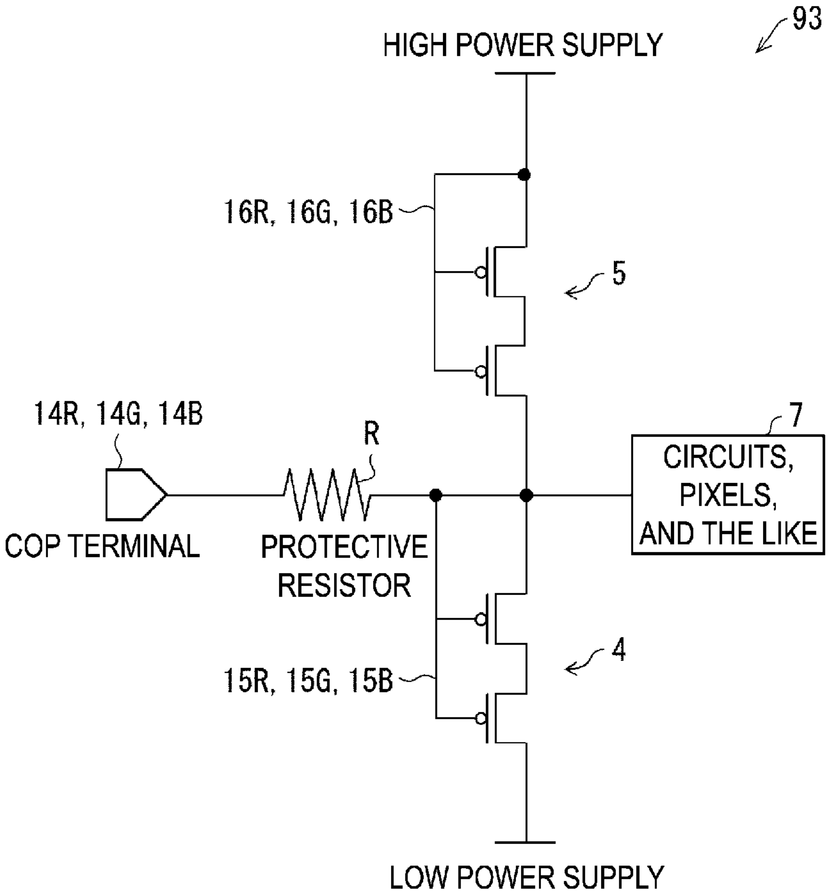
FIG. 6 is a circuit diagram of a video protection circuit according to a comparative example.

FIG. 6 is a circuit diagram of a video protection circuit 93 according to the comparative example. The video protection circuit 93 includes a protective resistor R having one end connected to the panel terminals 14R, 14G, and 14B, the high power supply connection circuits 16R, 16G, and 16B connected to the other end of the protective resistor R and the high power supply, and the low power supply connection circuits 15R, 15G, and 15B connected to the other end of the protective resistor R and the low power supply. Then, the pixel of the display region 7 is connected to the other end of the protective resistor R.

As described above, in the video protection circuit 93 according to the comparative example, the high power supply connection circuit and the low power supply connection circuit are integrated, and provided between the semiconductor chip 2 and the display region 7.

Figure 7:
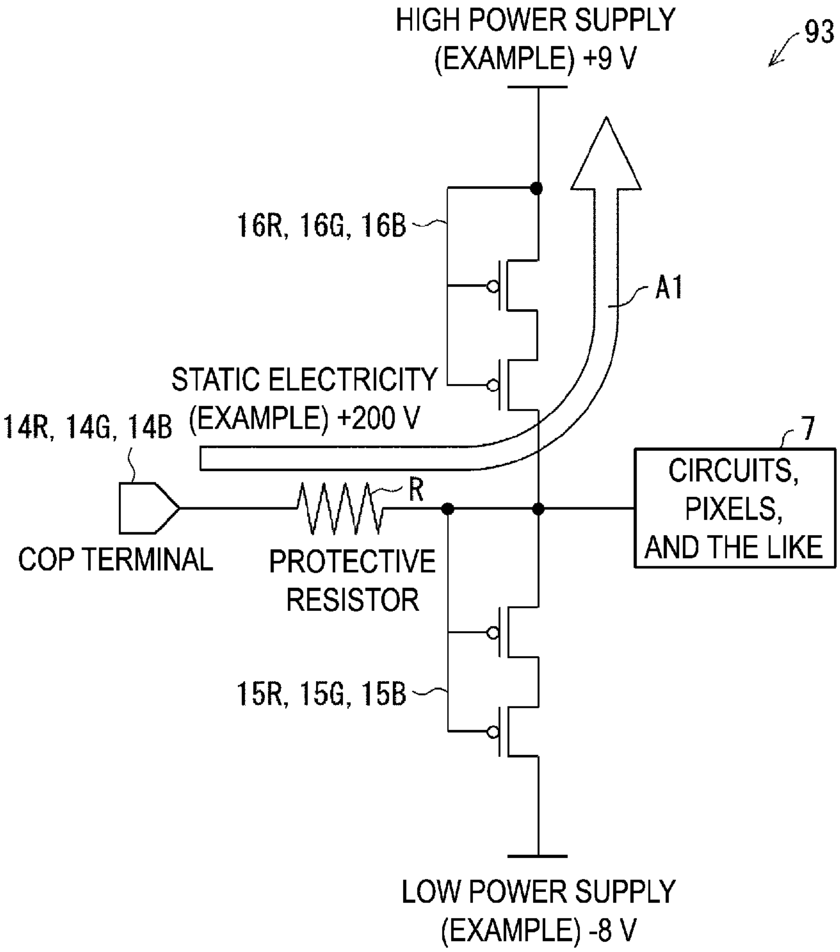
FIG. 7 is a circuit diagram for explaining an operation of the video protection circuit according to the comparative example.
Figure 8:
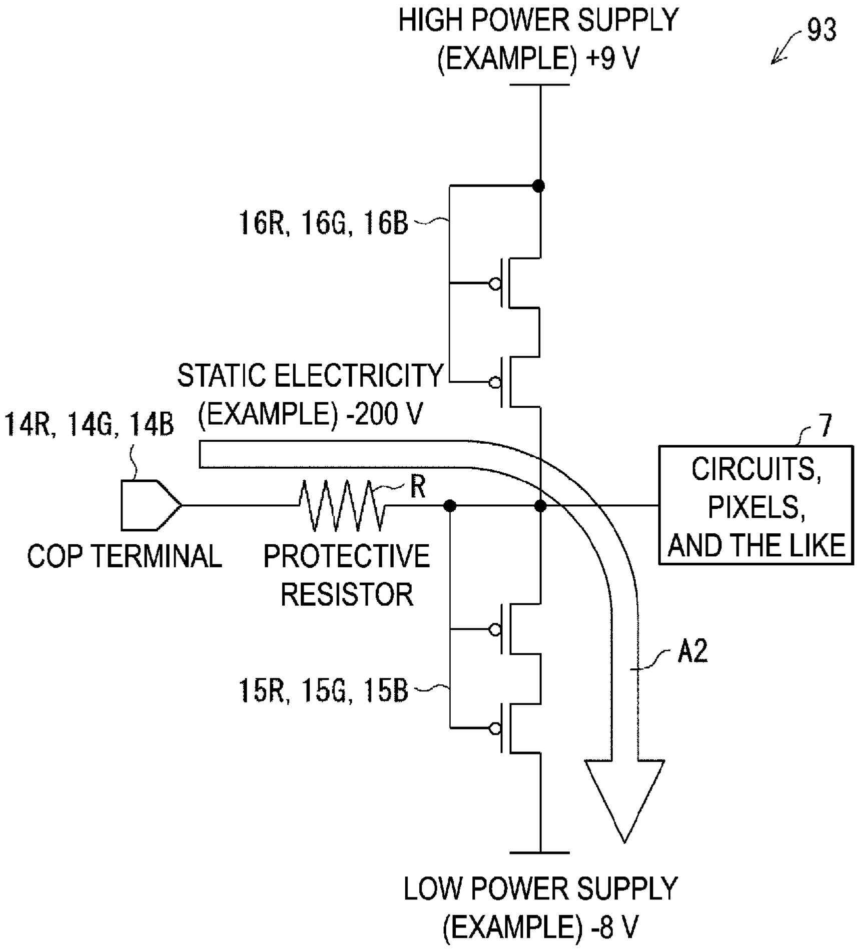
FIG. 8 is a circuit diagram for explaining another operation of the video protection circuit according to the comparative example.

FIG. 7 is a circuit diagram for explaining an operation of the video protection circuit 93. FIG. 8 is a circuit diagram for explaining another operation of the video protection circuit 93.

When static electricity of +200 V enters through the panel terminals 14R, 14G, and 14B, the entered static electricity flows to the high power supply through the protective resistor R and the high power supply connection circuits 16R, 16G, and 16B as indicated by an arrow A1 in FIG. 7. Therefore, the circuit and the pixel of the display region 7 are protected from the static electricity. When static electricity of −200 V enters through the panel terminals 14R, 14G, and 14B, the entered static electricity flows to the low power supply through the protective resistor R and the low power supply connection circuits 15R, 15G, and 15B as indicated by an arrow A2 in FIG. 8. Therefore, the circuit and the pixel in the display region 7 are also protected from the static electricity. The larger the resistance value of the protective resistor R is, the more the withstand voltage against static electricity is improved.

Figure 9:
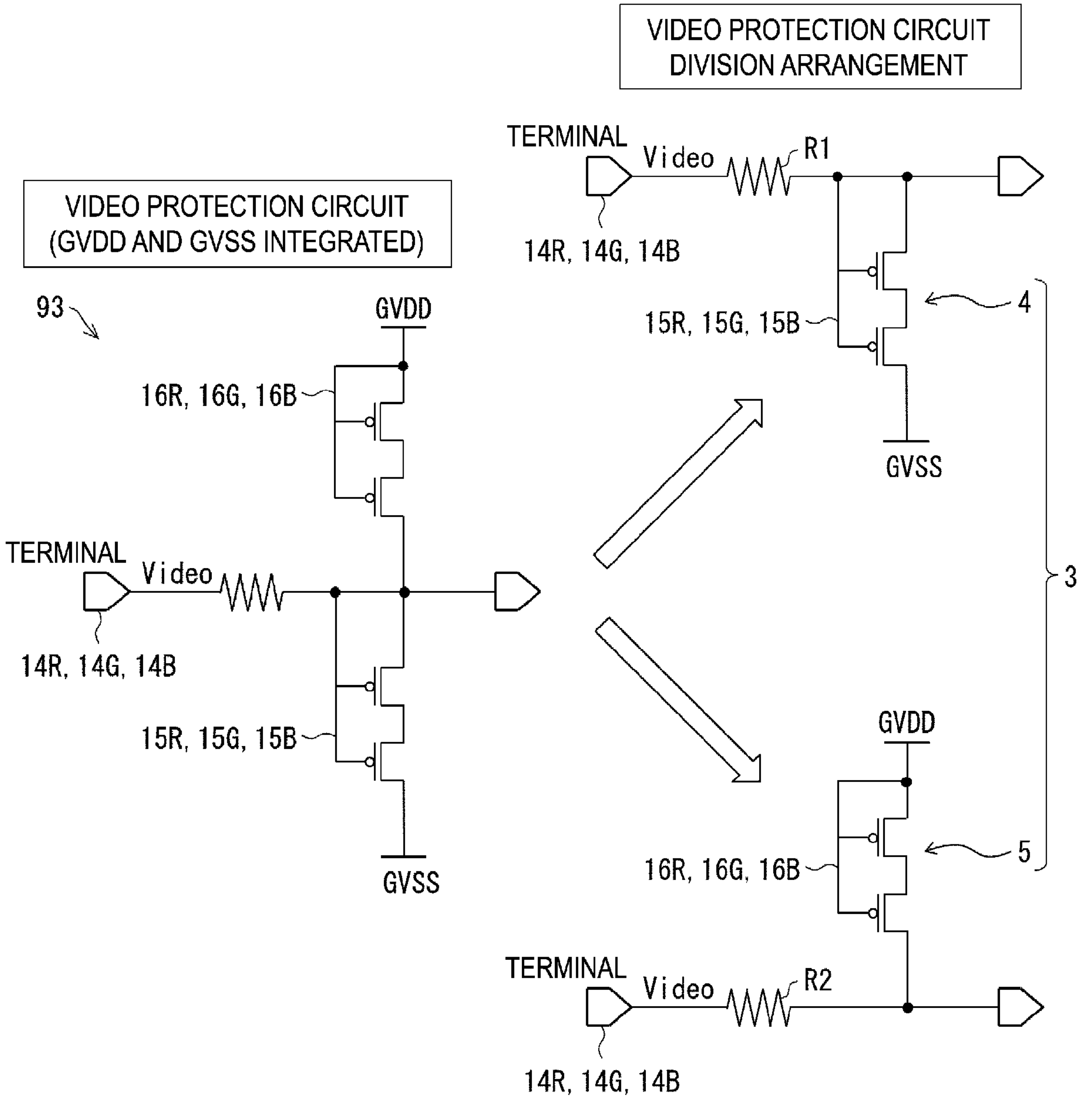
FIG. 9 is a view for explaining a relationship between the video protection circuit and the video protection circuit according to the comparative example.

FIG. 9 is a view for explaining the relationship between the video protection circuit 3 and the video protection circuit 93 according to the comparative example.

The video protection circuit 93 is preferably arranged between the output terminal portion 13 and the display region 7, but there is a problem that the frame region 8 becomes wider. Therefore, when an attempt is made to arrange the video protection circuit 93 under the semiconductor chip 2, there is a problem that the video protection circuit 93 cannot be collectively arranged in a case where there is no margin in the region between the input terminal portion 12 and the output terminal portion 13.

Even in a case where the video protection circuit 93 according to the comparative example cannot collectively be arranged because there is no margin in the region under the semiconductor chip 2, the video protection circuit 3 according to the present embodiment is divided into the low power supply connection portion 4 and the high power supply connection portion 5, the high power supply connection portion 5 is arranged under the semiconductor chip 2, and the low power supply connection portion 4 is arranged outside the semiconductor chip 2.

By dividing the video protection circuit 93 into the low power supply connection portion 4 and the high power supply connection portion 5, the low power supply connection portion 4 and the high power supply connection portion 5 of the video protection circuit 3 can be laid out smaller than those by dividing the video protection circuit 93 for each video terminal (signal). One of the reasons is that the power supply lines (the low power supply line 18 and the high power supply line 17) connected to each power supply can be reduced to one type (one line) in each of the circuits of the low power supply connection portion 4 and the high power supply connection portion 5.

The purpose of the video protection circuit 3 is to prevent static electricity from entering other circuits and pixels by causing static electricity to flow through the low power supply line 18 and the high power supply line 17 in a case where the static electricity actually enters from the panel terminals 14R, 14G, and 14B. Therefore, it is desirable to make the wiring line widths of the low power supply line 18 and the high power supply line 17 as wide as possible to reduce the resistance. Therefore, reducing the number of the low power supply line 18 and the high power supply line 17 can greatly contribute to widening of the wiring line widths of the low power supply line 18 and the high power supply line 17.

If the low power supply connection portion 4 and the high power supply connection portion 5 can be laid out smaller, they can be accommodated in a small arrangement region, and the distance from the output terminal portion 13 becomes long, and therefore the protective resistors R1 and R2 can be increased, and the withstand voltage of the video protection circuit 3 can be improved.

In a manufacturing process in which it is known in advance whether static electricity having a high frequency of entering through the panel terminals 14R, 14G, and 14B is static electricity on the high power supply side or static electricity on the low power supply side, one of the low power supply connection portion 4 and the high power supply connection portion 5 corresponding to the one having a high frequency may be arranged outside the semiconductor chip 2 farther from the panel terminals 14R, 14G, and 14B, and the other of the low power supply connection portion 4 and the high power supply connection portion 5 corresponding to the one having a low frequency may be arranged under the semiconductor chip 2 closer to the panel terminals 14R, 14G, and 14B. This improves the withstand voltage of the low power supply connection portion 4 and the high power supply connection portion 5.

For example, as illustrated in FIGS. 2 and 3, when the high power supply connection portion 5 is arranged under the semiconductor chip 2 and the low power supply connection portion 4 is arranged outside the semiconductor chip 2, the protective resistor R1 on the low power supply connection portion 4 side can be made larger than the protective resistor R2 on the high power supply connection portion 5 side. If it is known in advance that static electricity on the low power supply side tends to be generated from the environment of the manufacturing process or the like, arranging the low power supply connection portion 4 outside the semiconductor chip 2 improves the withstand voltage more.

When the video protection circuit 3 is divided into the low power supply connection portion 4 and the high power supply connection portion 5, a circuit width D2 of the high power supply connection portion 5 under the semiconductor chip 2 becomes narrower than that in a case where the video protection circuit 3 is not divided. Therefore, a distance D1 between the output terminal portion 13 of the panel terminal portion 9 and the high power supply connection portion 5 can be increased. Therefore, the protective resistor R2 between the panel terminals 14R, 14G, and 14B of the output terminal portion 13 and the high power supply connection circuits 16R, 16G, and 16B of the high power supply connection portion 5 can be further increased, and the withstand voltage of the high power supply connection portion 5 can be improved well.

Since the semiconductor chip 2 is small or the peripheral circuit such as the video protection circuit 3 including a thin film transistor is large, in a case where the peripheral circuit including the thin film transistor cannot be arranged to overlap the semiconductor chip 2, it is conceivable that the peripheral circuit including the thin film transistor is divided, a part of the peripheral divided circuit is arranged to overlap the semiconductor chip 2, and the rest is arranged at a position not overlapping the semiconductor chip 2. At that time, the video protection circuit 3 is not divided for each video terminal (signal), but divided into a circuit connected to the high power supply side and a circuit connected to the low power supply side. This enables the circuit to be laid out small.

The high power supply connection circuits 16R, 16G, and 16B (peripheral circuit elements) may be arrayed in accordance with a staggered array in which the panel terminals are arrayed obliquely to one another in accordance with a distance D3 between the output terminal portion 13 and the input terminal portion 12.

The pixels arrayed in the display region 7 are self-luminous display elements and are preferably organic light emitting diodes (OLEDs), but a liquid crystal display element can also achieve the same effect.

Note that the same effect can be achieved by arranging the low power supply connection portion 4 under the semiconductor chip 2 and arranging the high power supply connection portion 5 between the semiconductor chip 2 and the display region 7.

Second Embodiment

Figure 10:
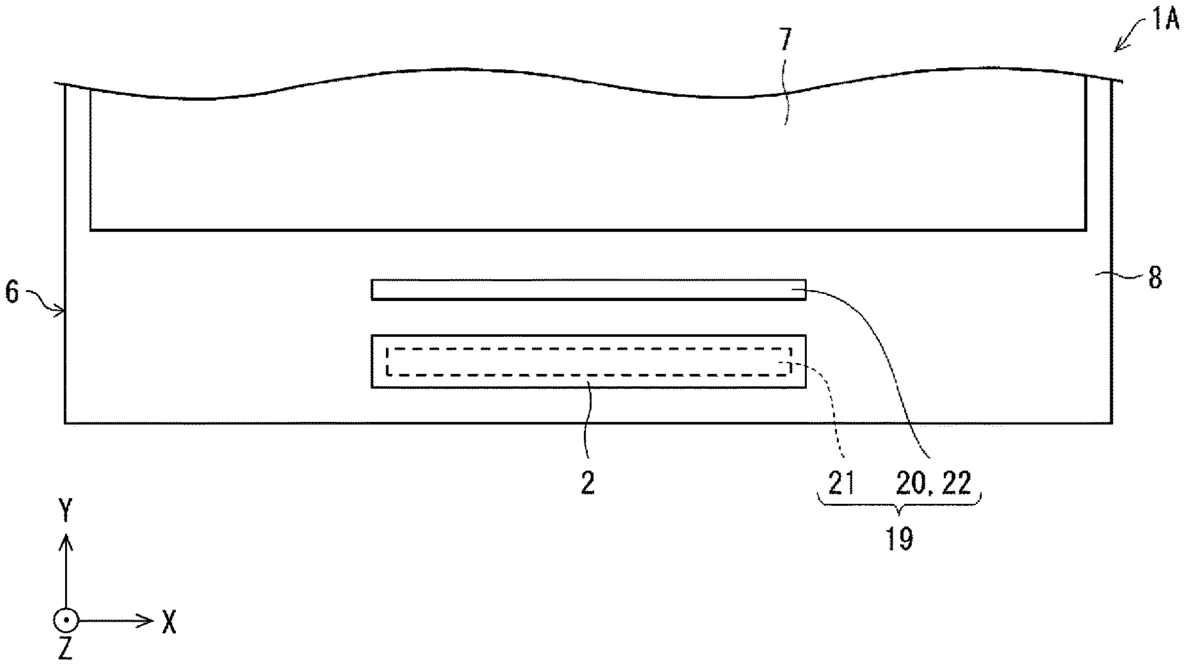
FIG. 10 is a plan view of a main part of a display device according to a second embodiment.
Figure 11:
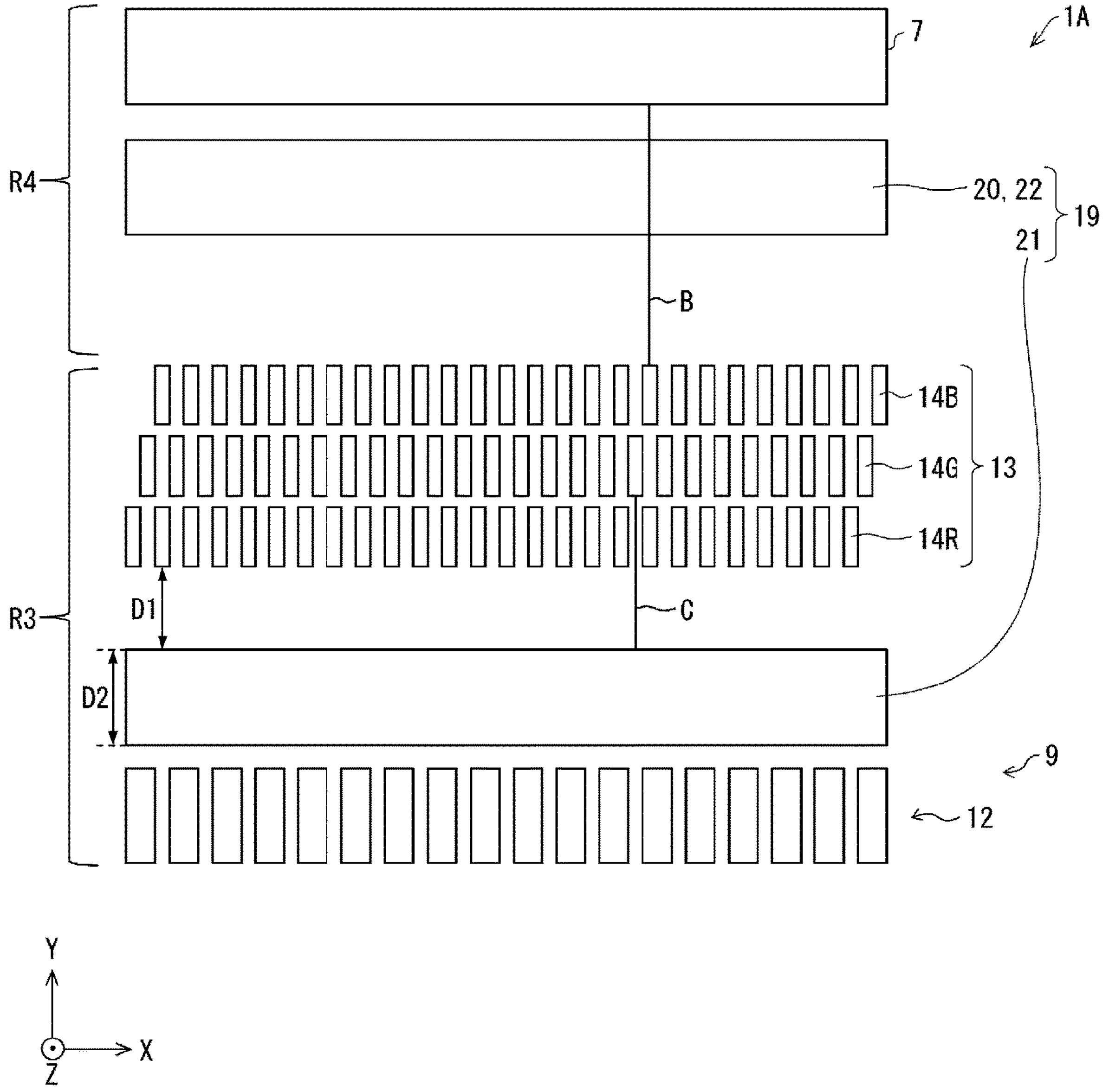
FIG. 11 is a schematic view illustrating an arrangement relationship among the pixels, the panel terminal portions, and a panel inspection circuit provided in the display device.
Figure 12:
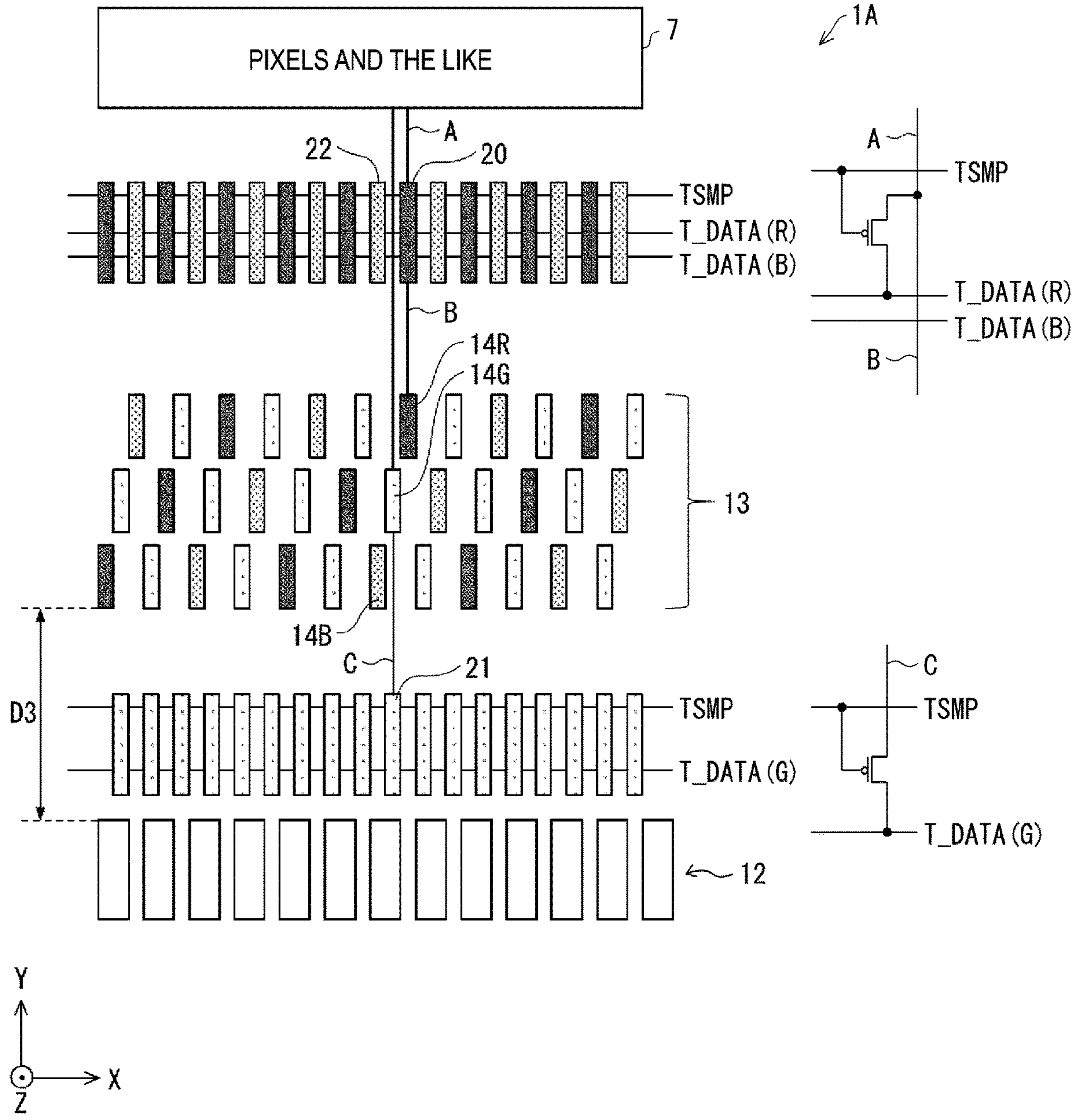
FIG. 12 is a schematic view illustrating an arrangement relationship of a first luminescent color inspection circuit, a second luminescent color inspection circuit, and a third luminescent color inspection circuit provided in the panel inspection circuit.
Figure 13:
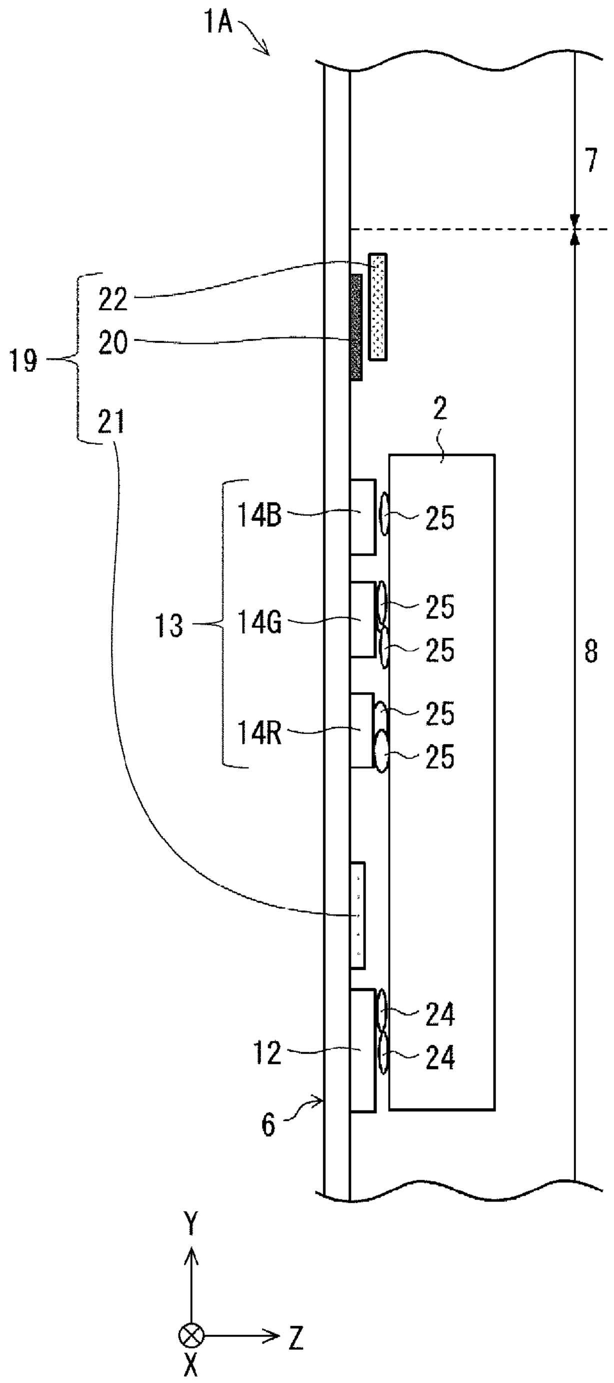
FIG. 13 is a cross-sectional view of the display device.
Figure 14:
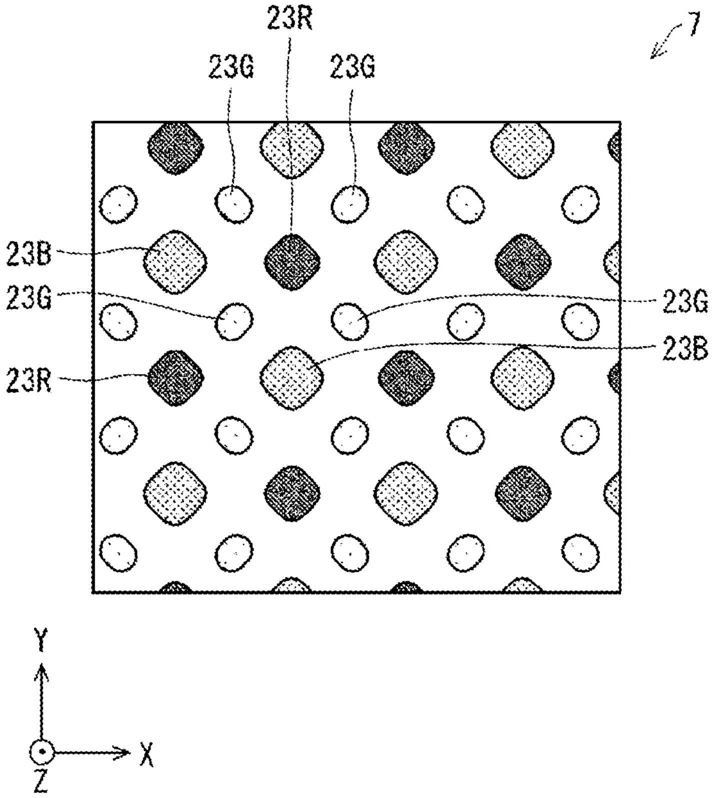
FIG. 14 is a schematic view illustrating an arrangement relationship of first subpixels, second subpixels, and third subpixels provided in the display device.

FIG. 10 is a plan view of a main part of a display device 1A according to the second embodiment. FIG. 11 is a schematic view illustrating the arrangement relationship among the pixels, the panel terminal portion 9, and a panel inspection circuit 19 provided in the display device 1A. FIG. 12 is a schematic view illustrating the arrangement relationship of a first luminescent color inspection circuit 20, a second luminescent color inspection circuit 21, and a third luminescent color inspection circuit 22 provided in the panel inspection circuit 19. FIG. 13 is a cross-sectional view of the display device 1A. FIG. 14 is a schematic view illustrating the arrangement relationship of first subpixels 23R, second subpixels 23G, and third subpixels 23B provided in the display device 1A. Constituent elements similar to the constituent elements described above are given the same reference numerals, and detailed descriptions thereof are not repeated.

The display device 1A includes a semiconductor chip 2 mounted in a frame region 8 arranged around a display region 7 in order to supply a video signal to a plurality of pixels arranged in the display region 7 of a display panel 6, and the panel inspection circuit 19 (peripheral circuit) formed in the frame region 8 in order to inspect the pixels of the display region 7 before the semiconductor chip 2 is mounted in the frame region 8.

The panel inspection circuit 19 supplies, to the pixel and the pixel circuit for controlling the pixel, a signal for inspecting the operation of the pixel before the semiconductor chip 2 is mounted.

Each pixel arranged in the display region 7 includes the first subpixel 23R for emitting red (first luminescent color) light, the second subpixel 23G for emitting green (second luminescent color) light, and the third subpixel 23B for emitting blue (third luminescent color) light. The first subpixels 23R, the second subpixels 23G, and the third subpixels 23B are arrayed in accordance with the configuration of RB/G by subpixel rendering (SPR) as illustrated in FIG. 14. The sum of the number of the first subpixels 23R and the number of the third subpixels 23B corresponds to the number of the second subpixels 23G.

The panel inspection circuit 19 includes the first luminescent color inspection circuit 20 (panel inspection circuit and peripheral circuit) that supplies a first data signal for inspecting the operation of the first subpixels 23R to the first subpixels 23R, the second luminescent color inspection circuit 21 (panel inspection circuit and peripheral circuit) that supplies a second data signal for inspecting the operation of the second subpixels 23G to the second subpixels 23G, and the third luminescent color inspection circuit 22 (panel inspection circuit and peripheral circuit) that supplies a third data signal for inspecting the operation of the third subpixels 23B to the third subpixels 23B.

The first luminescent color inspection circuit 20 and the third luminescent color inspection circuit 22 are arranged between the semiconductor chip 2 and the display region 7. The second luminescent color inspection circuit 21 is arranged between the output terminal portion 13 and the input terminal portion 12 under the semiconductor chip 2.

A plurality of the first luminescent color inspection circuits 20 and a plurality of the third luminescent color inspection circuits 22 are alternately arrayed along the X direction outside the semiconductor chip 2. A supply line T_DATA(R) for supplying the first data signal to the first luminescent color inspection circuit 20 is provided in common for the plurality of first luminescent color inspection circuits 20. A supply line T_DATA(B) for supplying the third data signal to the third luminescent color inspection circuit 22 is provided in common for the plurality of third luminescent color inspection circuits 22.

A plurality of the second luminescent color inspection circuits 21 are arrayed along the X direction under the semiconductor chip 2. A supply line T_DATA(G) for supplying the second data signal to the second luminescent color inspection circuit 21 is provided in common for the plurality of second luminescent color inspection circuits 21.

The plurality of panel terminals 14R, the plurality of panel terminals 14G, and the plurality of panel terminals 14B are arrayed in a staggered array in which the panel terminals are arrayed obliquely to one another.

The panel terminal 14R is connected to the first luminescent color inspection circuit 20. The first luminescent color inspection circuit 20 is connected to the first subpixel 23R arranged in the display region 7. The panel terminal 14B is connected to the third luminescent color inspection circuit 22. The third luminescent color inspection circuit 22 is connected to the third subpixel 23B arranged in the display region 7.

The panel terminal 14G is connected to the second luminescent color inspection circuit 21 and the second subpixels 23G arranged in the display region 7.

The second luminescent color inspection circuits 21 (peripheral circuit element) may be arrayed in accordance with a staggered array in which the panel terminals are arrayed obliquely to one another in accordance with a distance D3 between the output terminal portion 13 and the input terminal portion 12.

Figure 15:
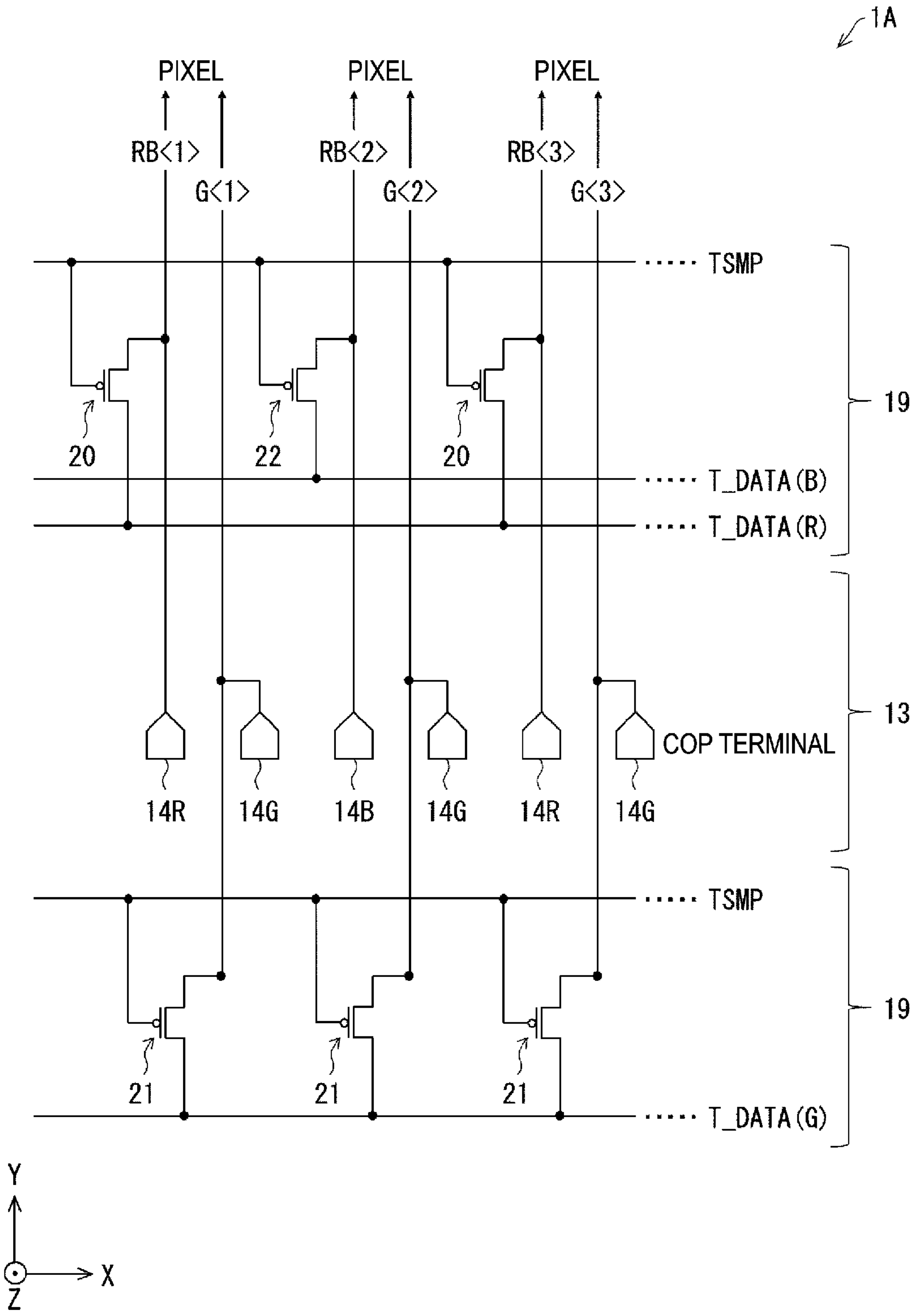
FIG. 15 is a circuit diagram of the first luminescent color inspection circuit, the second luminescent color inspection circuit, and the third luminescent color inspection circuit.
Figure 16:
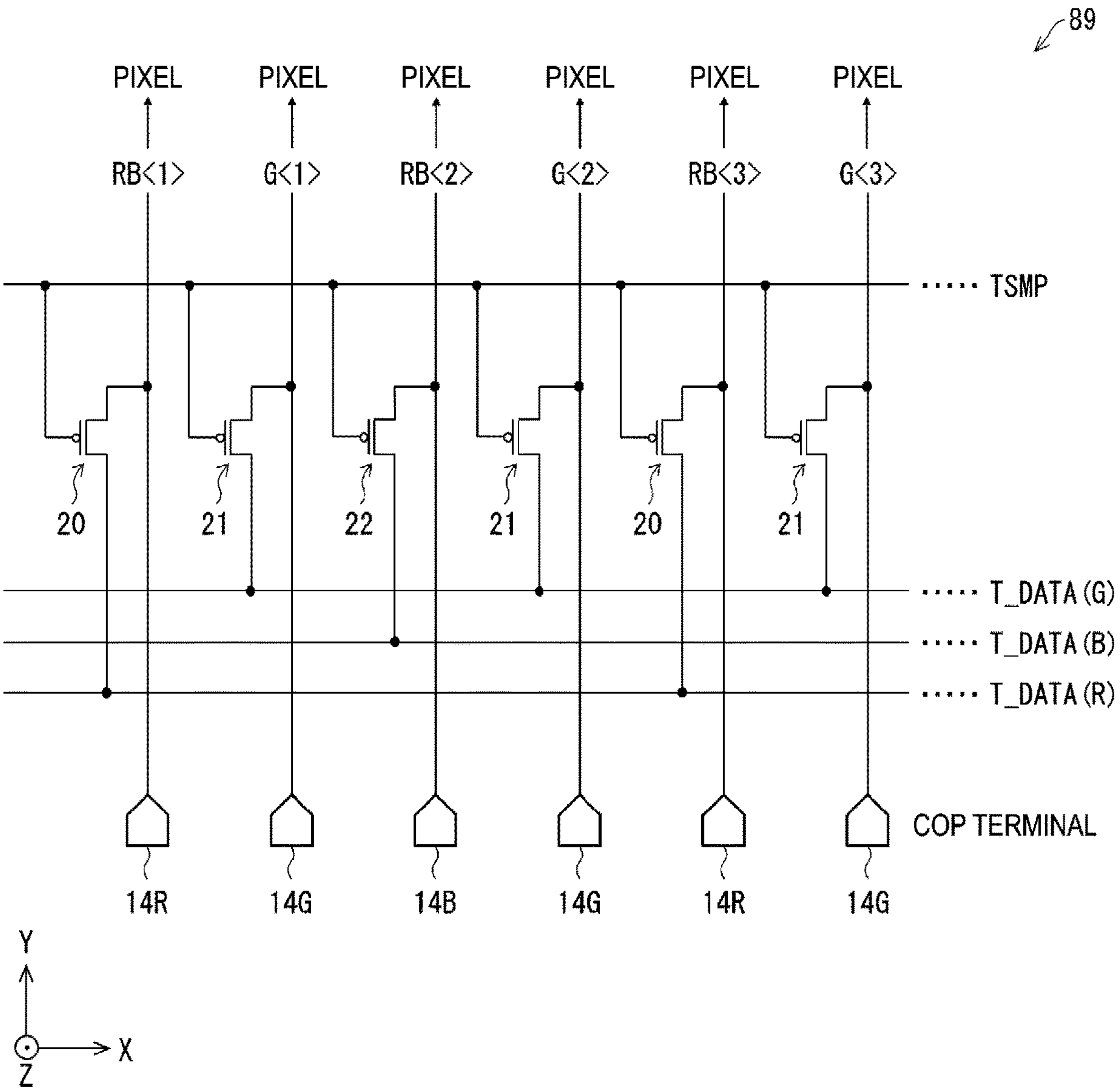
FIG. 16 is a circuit diagram of a panel inspection circuit according to a comparative example.

FIG. 15 is a circuit diagram of the first luminescent color inspection circuit 20, the second luminescent color inspection circuit 21, and the third luminescent color inspection circuit 22. FIG. 16 is a circuit diagram of a panel inspection circuit 89 according to a comparative example.

The panel inspection circuit 19 includes the first luminescent color inspection circuit 20 and the third luminescent color inspection circuit 22 alternately arrayed along the X direction outside the semiconductor chip 2, and the second luminescent color inspection circuit 21 arrayed along the X direction under the semiconductor chip 2. The panel inspection circuit 89 according to the comparative example includes the first luminescent color inspection circuit 20, the second luminescent color inspection circuit 21, and the third luminescent color inspection circuit 22 arrayed along the X direction. When a signal for turning on the transistor is input to a wiring line TSMP in a state before the semiconductor chip 2 is mounted, a video signal is input to each of the data lines T_DATA(R), T_DATA(G), and T_DATA(B), display in the first subpixel 23R, the second subpixel 23G, and the third subpixel 23B arranged in the display region 7 becomes possible, and inspection of the first subpixel 23R, the second subpixel 23G, and the third subpixel 23B becomes possible.

In a case where the entire panel inspection circuit 89 cannot be collectively arranged under the semiconductor chip 2 because there is no margin in the region under the semiconductor chip 2, the panel inspection circuit 89 is divided and arranged for each luminescent color of the corresponding subpixel as in the panel inspection circuit 19. That is, the panel inspection circuit 19 has the first luminescent color inspection circuit 20 corresponding to the first subpixel 23R that emits red light and the third luminescent color inspection circuit 22 corresponding to the third subpixel 23B that emits blue light arranged between the semiconductor chip 2 and the display region 7 outside the semiconductor chip 2. Then, the panel inspection circuit 19 has the second luminescent color inspection circuit 21 corresponding to the second subpixel 23G that emits green light arranged under the semiconductor chip 2.

In the display region 7 of the display panel 6, the first subpixels 23R that emit red light, the second subpixels 23G that emit green light, and the third subpixels 23B that emit blue light are arrayed as illustrated in FIG. 14. The first subpixel 23R, the second subpixel 23G, and the third subpixel 23B are arrayed such that the sum of the number of the first subpixels 23R and the number of the third subpixels 23B corresponds to the number of the second subpixels 23G.

The first luminescent color inspection circuit 20, the second luminescent color inspection circuit 21, and the third luminescent color inspection circuit 22 are arrayed such that the sum of the numbers of the first luminescent color inspection circuits 20 and the third luminescent color inspection circuits 22 corresponds to the number of the second luminescent color inspection circuits 21 so as to match the first subpixels 23R, the second subpixels 23G, and the third subpixels 23B. Therefore, the number of the second luminescent color inspection circuits 21 under the semiconductor chip 2 and the sum of the number of the first luminescent color inspection circuits 20 and the number of the third luminescent color inspection circuits 22 outside the semiconductor chip 2 can be made substantially the same.

As described above, when the panel inspection circuit 19 is divided on an RB pixel side and a G pixel side, the panel inspection circuit 19 can be laid out smaller than that when divided for each video terminal (signal). One of the reasons is that a test video signal supply wiring line can be made to one type the RB pixel side and the G pixel side.

When the panel inspection circuit 19 is divided into an even-numbered video terminal (signal) and an odd-numbered video terminal (signal), three types of test video signal supply wiring lines of RGB are required on both the even-numbered side and the odd-numbered side, and hence the panel inspection circuit 19 cannot be laid out smaller.

In a case where each of the panel inspection circuits on the RB pixel side and the G pixel side performs a panel inspection, particularly in a case where an AC signal is input, it is desirable that the wiring line width for the test video signal is as wide as possible and the resistance is reduced. Therefore, reducing the number of test video signal supply wiring lines can greatly contribute to widening of the wiring line width.

In particular, as in the example illustrated in FIG. 14, in a case of RB/G in subpixel rendering (SPR), it is sufficient that a signal such as almost DC is input to the second subpixels 23G at the time of inspection. In this case, the test video line width of the second subpixels 23G is not required to be so wide, and an inspection circuit width on the second subpixels 23G pixel side can be narrower. Therefore, it is desirable to arrange the second luminescent color inspection circuit 21 corresponding to the second subpixel 23G under the semiconductor chip 2.

Since the panel inspection circuit 19 also has an element capable of releasing static electricity as in the video protection circuit 3, an effect similar to that of the video protection circuit 3 can be expected.

As an effect of arranging the second luminescent color inspection circuit 21 of the panel inspection circuit 19 having a narrow circuit width under the semiconductor chip 2, since the circuit width D2 of the second luminescent color inspection circuit 21 can be made narrower than that of the comparative example, the distance D1 from the output terminal portion 13 to the second luminescent color inspection circuit 21 of the panel inspection circuit 19 can be secured longer. By securing a long distance from the panel terminal 14G to the second luminescent color inspection circuit 21 of the panel inspection circuit 19, it is assumed that the resistance from the panel terminal 14G to the second luminescent color inspection circuit 21 can be increased more, and the withstand voltage is improved more.

The disclosure is not limited to each of the embodiments described above, and various modifications may be made within the scope of the claims. Embodiments obtained by appropriately combining technical approaches disclosed in each of the different embodiments also fall within the technical scope of the disclosure. Furthermore, novel technical features can be formed by combining the technical approaches disclosed in each of the embodiments.

The invention claimed is:

1. A display device comprising:

a semiconductor chip mounted in a frame region arranged around a display region in which a plurality of pixels of a display panel is formed; and a peripheral circuit formed in the frame region, wherein the peripheral circuit includes an off-chip division circuit formed between the semiconductor chip and the display region, and an under-chip division circuit formed under the semiconductor chip, wherein the display panel includes a plurality of panel terminals to which a plurality of respective output terminals of the semiconductor chip is joined, and wherein the peripheral circuit is a video protection circuit configured to protect the plurality of pixels from static electricity entering through the plurality of panel terminals.

2. The display device according to claim 1, wherein the semiconductor chip includes a plurality of input terminals arrayed along a longitudinal direction of the semiconductor chip and the plurality of respective output terminals arrayed along the longitudinal direction, the peripheral circuit further includes a thin film transistor on the display panel, the off-chip division circuit is formed, in the frame region, in a region between the array of the plurality of respective output terminals and the display region, and the under-chip division circuit is formed, in the frame region, in a region between the array of the plurality of input terminals and the array of the plurality of respective output terminals.

3. The display device according to claim 1, further comprising:

a pixel circuit configured to control the plurality of pixels, wherein the off-chip division circuit and the under-chip division circuit include a thin film transistor that is formed of a same material in a same layer, and that protects or inspects the pixel circuit.

4. The display device according to claim 1, wherein the video protection circuit includes a first potential circuit connected to a first potential power supply having a first potential, and a second potential circuit connected to a second potential power supply having a second potential higher than the first potential, the off-chip division circuit includes one of the first potential circuit and the second potential circuit, and the under-chip division circuit includes the other one of the first potential circuit and the second potential circuit.

5. The display device according to claim 4, wherein a plurality of first potential circuits, including the first potential circuit, is arranged corresponding to the plurality of panel terminals, and the first potential power supply is provided in common for the plurality of first potential circuits.

6. The display device according to claim 1, further comprising:

a first wiring line configured to connect the plurality of panel terminals and the under-chip division circuit; and a second wiring line configured to connect the plurality of panel terminals, the off-chip division circuit, and the plurality of pixels.

7. The display device according to claim 1, wherein the plurality of panel terminals is arrayed in a staggered array in which the plurality of panel terminals is arrayed obliquely to one another, and the peripheral circuit includes a plurality of peripheral circuit elements arrayed in the staggered array corresponding to the plurality of panel terminals.

8. The display device according to claim 1, wherein each of the plurality of pixels includes a self-luminous display element or a liquid crystal display element.

9. A display device comprising:

a semiconductor chip mounted in a frame region arranged around a display region in which a plurality of pixels of a display panel is formed; and a peripheral circuit formed in the frame region, wherein the peripheral circuit includes an off-chip division circuit formed between the semiconductor chip and the display region, and an under-chip division circuit formed under the semiconductor chip, and wherein the off-chip division circuit and the under-chip division circuit are circuits having a same shape.

10. The display device according to claim 9, wherein the semiconductor chip includes a plurality of input terminals arrayed along a longitudinal direction of the semiconductor chip and a plurality of output terminals arrayed along the longitudinal direction, the peripheral circuit further includes a thin film transistor on the display panel, the off-chip division circuit is formed, in the frame region, in a region between the array of the plurality of output terminals and the display region, and the under-chip division circuit is formed, in the frame region, in a region between the array of the plurality of input terminals and the array of the plurality of output terminals.

11. The display device according to claim 9, further comprising:

a pixel circuit configured to control the plurality of pixels, wherein the off-chip division circuit and the under-chip division circuit include a thin film transistor formed of a same material in a same layer, and protect or inspect the pixel circuit.

* * * * *